United States Patent [19]

Stevenson

[11] Patent Number: 4,721,938
[45] Date of Patent: Jan. 26, 1988

[54] PROCESS FOR FORMING A SILICON PRESSURE TRANSDUCER

[75] Inventor: Paul E. Stevenson, Kokomo, Ind.

[73] Assignee: Delco Electronics Corporation, Kokomo, Ind.

[21] Appl. No.: 943,956

[22] Filed: Dec. 22, 1986

[51] Int. Cl.4 .................... G01L 1/22; H01L 21/306; B44C 1/22; C03C 15/00

[52] U.S. Cl. ...................................... 338/4; 29/25.35; 29/610 SG; 148/33.2; 156/644; 156/647; 156/653; 156/657; 156/659.1; 156/662; 357/26; 428/156

[58] Field of Search ............... 338/2, 4; 156/644, 647, 156/653, 657, 659.1, 662; 73/719, 720, 721, 725, 726, 727; 357/26; 29/25.35, 576 E, 610, 610 SG; 148/1.5, 175, 187, DIG. 12, DIG. 159, 33.1-33.4; 428/156, 157, 446

[56] References Cited

U.S. PATENT DOCUMENTS

| | | | |
|---|---|---|---|
| 3,858,150 | 12/1974 | Gurtler et al. | 338/2 |
| 4,227,942 | 10/1980 | Hall | 136/255 |
| 4,295,115 | 10/1981 | Takahashi et al. | 338/4 |
| 4,295,117 | 10/1981 | Lake et al. | 338/4 |
| 4,400,681 | 8/1983 | Brown et al. | 338/4 |
| 4,618,397 | 10/1986 | Shimizu et al. | 156/628 |
| 4,670,969 | 6/1987 | Yamada et al. | 29/25.35 X |

OTHER PUBLICATIONS

Gallagher, Robert T., "Thomson-CSF, CNET Team for SOI," Electronics Week, (Semiconductor Section), Mar. 11, 1985.

Rathman, Silversmith and Burns, "Lateral Epitaxial Overgrowth of Silicon on SiO$_2$," Journal of the Electrochemical Society: Solid State Science and Technology, v. 129, No. 10, pp. 2303-2306 (Oct. 1982).

Celler, Robinson and Trimble, "Dielectrically Isolated Thick Si Films by Lateral Epitaxy from the Melt," Journal of the Electrochemical Society: Solid-State Science and Technology, v. 132, No. 1, pp. 211-219 (Jan. 1985).

Primary Examiner—William A. Powell
Attorney, Agent, or Firm—Robert J. Wallace

[57] ABSTRACT

A piezoresistive pressure transducer is formed in a silicon layer which has been grown over a monocrystalline silicon substrate, a central portion of which had been earlier coated with a silicon dioxide layer having a plurality of apertures under each of which had been formed a heavily doped etch resistant region. The silicon layer is grown epitaxially over the apertures to be monocrystalline but grows as polycrystalline material over the silicon dioxide. Then the silicon substrate is etched to remove its central portion under the silicon dioxide and the heavily doped regions, leaving a thick surrounding portion for support. Resistors are formed in the monocrystalline portions of the grown layer overlying the heavily doped regions.

8 Claims, 4 Drawing Figures

PROCESS FOR FORMING A SILICON PRESSURE TRANSDUCER

FIELD OF THE INVENTION

This invention relates to semiconductor technology and more particularly to a process for preparing a chip of piezoresistive material, such as silicon, for use in a pressure sensitive transducer and the product of such a process.

CROSS REFERENCE

There is being filed concurrently with this application a related application U.S. Ser. No. 940,357 currently pending, having the same inventorship and a common assignee.

BACKGROUND OF THE INVENTION

Pressure sensitive transducers using a chip of a piezoresistive material, such as silicon, are now widely used. Typically, such transducers are useful in measuring and/or control systems. Such a transducer typically includes a silicon chip which has a thinned out central portion to form a thin flexible diaphragm in which are formed localized regions doped to serve as resistors whose resistance varies with the degree of flexing of the diaphragm. The resistors are then typically connected into a bridge for detecting the resistance changes and providing a measure of the pressure acting to flex the diaphragm. In such a device, for uniformity of results from chip to chip, it is important accurately to control the thickness of the diaphragm portion and the properties of the resistors. Various techniques are available for forming the diaphragm by thinning the chip but these are not completely satisfactory. Presently, the method believed most common involves forming a heavily doped surface layer in a silicon substrate, growing an epitaxial layer over such heavily doped layer and then etching away the central portion of the original substrate, using the heavily doped layer as an etch-stop for limiting the etching and assuring that the thinned region has essentially the thickness of the epitaxial layer modified by the thickness of the relatively thinner heavily doped layer. This process has a problem, since the dopants in the heavily doped layer tend to out-diffuse into the epitaxial layer as the latter is being formed. This effect, which is typically described as auto-doping, undesirably reduces the resistivity of the epitaxial layer and so affects the properties of the resistors later to be formed in such epitaxial layer.

It has also been proposed to utilize as the buried etch stop a continuous etch-resistant layer, such as of silicon nitride. However, such an etch stop normally precludes the growing of monocrystalline silicon thereover, necessitating the forming of the pressure-sensitive resistors in polycrystalline silicon. This resulted in resistors of poorer piezoresistance properties.

In the copending related application mentioned above, an apertured layer of an etch-resistant material such as silicon nitride, is buried in the silicon chip and used instead as the etch-stop, thereby to avoid the auto-doping described associated with the doped layer. Moreover, to have a monocrystalline layer in which to form the pressure-sensitive resistors, the apertures in the layer are designed to permit the layer formed thereover largely to grow epitaxially, the silicon exposed in the apertures seeding the growth, so that the grown layer is essentially monocrystalline. Moreover, the starting chip was chosen to have front and back surfaces which were cut along <100> crystal planes. Then to etch the substrate and to form the thinned diaphragm central portion, an anisotropic etch which preferentially etches along the <100> planes is used to self-limit the etching action once the etch-stop pattern is reached. This process may prove difficult to control because of its dependence on a self-limiting process based on an anisotropic etch. It is sometimes desirable to have a process free of such limitations and the present invention is so directed.

Moreover, this related application involves a process which uses a finely apertured etch resistant buried layer to form a grown layer which is essentially all monocrystalline, which sometimes proves demanding.

The present invention involves a less demanding process.

SUMMARY OF THE INVENTION

A process in accordance with this aspect of the invention uses, for limiting the etching for forming the flexible diaphragm, a buried etch stop which utilizes a layer of an etch-resistant material, including openings to expose silicon for seeding the subsequent growth of an overlying epitaxial layer, and additionally utilizes buried regions of heavily doped silicon to fill the openings in the layer. However, in this instance, the openings may be fewer than used in the related application, for example, limited to four, since it will be adequate to grow thereover a layer of which only the portions where device components, such as resistors, are to be formed need be monocrystalline, while the remainder may be polycrystalline. As a consequence the heavily doped regions used to fill these openings will have a relatively small area and so will tend to be only a minor source of auto-doping. However, these heavily doped regions will serve adequately as an etch stop at such openings, whereby there is achieved a relatively smooth back surface for the diaphragm portion of the chip.

In an illustrative embodiment, the process of forming a chip useful as a pressure transducer, comprises the following basic steps.

First there is prepared a silicon monocrystalline substrate and over the surface of this substrate a blanket layer of an etch-resistant material, is formed. This layer is then apertured to provide windows. Typically, four windows are formed. Conventional photolithography processing can be used to this end. The windows should be formed to underlie the regions where the resistors are to be formed in the diaphragm. Then the substrate is treated in conventional fashion to heavily dope the substrate portions exposed by the windows to form the etch-resistant regions to be used to limit etching of such regions. Then a layer of silicon is grown over the substrate to bury the etch-resistant silicon dioxide layer and the heavily doped regions. This layer will grow epitaxially as monocrystalline silicon over the windows and as polysilicon over the silicon oxide. Next, the exposed back surface of the substrate is appropriately masked so that the etching will leave an unetched surrounding border for the hollowed-out cavity etched for thinning the chip. The etching is continued until stopped by the buried etch stop. The desired electrical components are then formed in the monocrystalline portions of the grown layer.

The invention will be better understood from the following more detailed description taken with the accompanying drawings.

Figure 1:
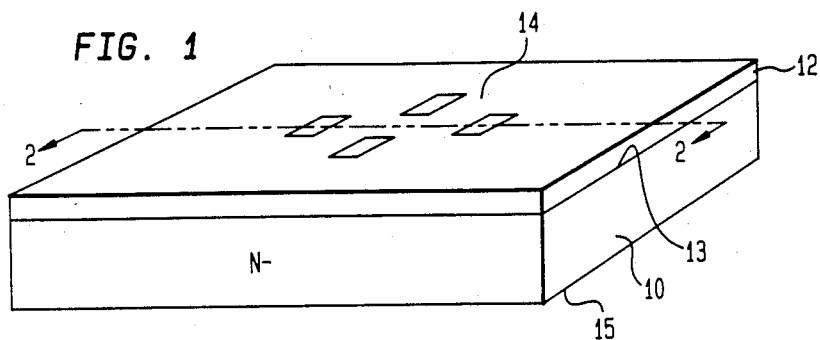
FIG. 1 shows in perspective the work piece at a preliminary stage of processing in accordance with the present invention.

It is to be noted that the drawings are not to scale since the vertical dimensions generally are much smaller than the horizontal dimensions. To avoid confusion, no background lines are shown in the cross sectional views of the drawing.

DETAILED DESCRIPTION OF THE INVENTION

As appears from the foregoing, the present invention may be viewed as including two basic operations. The first is the preparation of a piezoresistive chip which has a buried etch stop which divides the chip into its original monocrystalline substrate and a grown layer which needs to be monocrystalline only in selected regions. The second is the etching of the chip to remove a central portion of the substrate to define a diaphragm portion of the grown layer which portion includes the monocrystalline regions in which the piezoresistive resistors are to be formed.

To begin the first operation, there is prepared a suitable starting silicon substrate. Typically, this is a chip cut along the <100> planes of a silicon single crystal which is lightly doped n-type with an excess donor concentration of about $5 \times 10^{14}$ donors per cubic centimeter. Typically the chip may be about 15 mils thick. Then an etch-resistant layer, is formed over a front surface of the chip, for example of silicon dioxide or silicon nitride or a composite of the two. Its thickness advantageously is in the range between about 700 Angstroms and 10,000 Angstroms. The thinner the layer usually the better is the quality of the grown layer formed thereover, the thicker the layer the more protection is provided against overetching in the subsequent thinning operation.

Next this layer is patterned to open windows in it. Typically four windows are adequate, each about one mil by about ten mils, and located in the regions where the resistors are desirably to be formed. Conventional techniques can be used for this familiar step.

Then, the substrate is treated to form heavily-doped p+ type regions, localized at the windows, which are to complement the silicon compound layer as the etch stop. These may be relatively shallow, typically several microns deep. Boron diffusion to a concentration of typically $5 \times 10^{19}$ donors per cubic centimeter or greater is illustrative of this step.

The resultant is shown in FIG. 1. The silicon chip which serves as the substrate 10 has a front surface 13 overlain with a layer of silicon dioxide 12 which is apertured to form windows 14 of which four are shown and under which lie the boron-doped p+ type regions 16 (not seen in this view but seen in the sectional view of FIG. 2).

Figure 2:
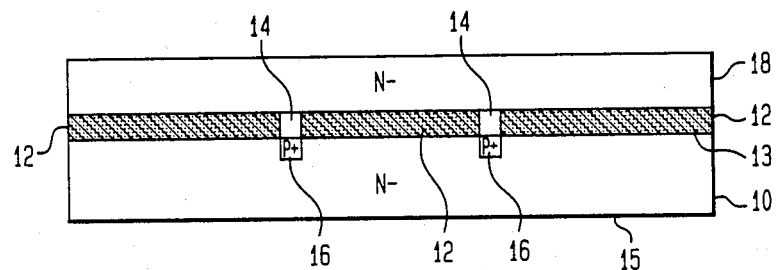
FIGS. 2-4 show cross sections of the work piece along the line 2-2 of FIG. 1 at various subsequent stages of processing in accordance with the present invention.

Next over a top surface of layer 12 is deposited a silicon layer 18 under conditions, known in the art, to grow the silicon epitaxially as monocrystalline regions 14 over the exposed heavily doped regions 16 and polycrystalline or amorphous over the silicon dioxide layer 12. If found necessary, the grown layer can subsequently be heat treated, for example, by a laser, to improve the monocrystalline nature of the regions where the resistors are to be formed. Advantageously, this deposited layer is grown to be lightly doped n-type (typically about $1 \times 10^{15}$ donors per cubic centimeter) and so is of high resistivity. The thickness of this layer is adjusted to match the thickness desired for the diaphragm portion of the chip, one mil is typical. Close control of this thickness is possible because of the ease of controlling the growth process which proceeds relatively slowly. In FIG. 2, there is shown the resultant with the grown layer 18 now overlying the substrate 10.

Figure 3:
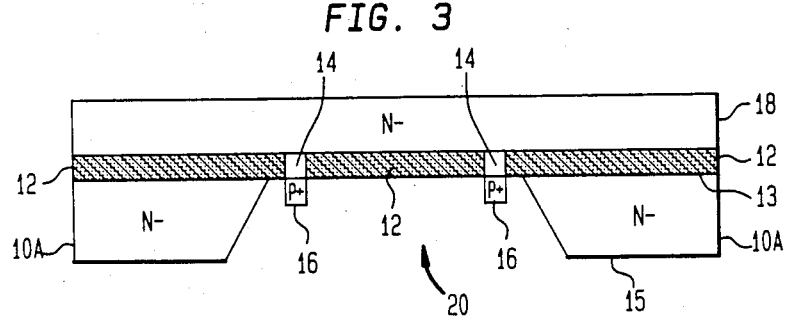

Next as the second basic operation there needs to be appropriately shaped the original substrate to form the diaphragm portion of the chip. Preliminary to etching to accomplish this, a back surface 15 of substrate 10 is covered with a blanket layer of etch-resistant material, which may be of the same material used for the now buried layer 12, and this new layer is patterned to expose the central portion of the back surface which is to be etched. Exposed portions of layer 18 should similarly be protected before the etching is commenced. The etching is then carried out for the desired hollowing-out of the cente of the substrate. Although not necessary, it is advantageous to utilize an etchant, such as ethylene diamine or hydrozine, which etches faster along <100> planes than along <111> planes to form planar side walls, defined by the <111> crystal planes, in the cavity. The etching will stop when it reaches the etch-resistant barrier formed by the combination of the heavily-doped regions 16 and the buried silicon compound layer 12. The resultant is shown in FIG. 3 where substrate 10 of the chip is shown hollowed out to form a cavity 20 whose bottom is determined by the etch resistant barrier comprising doped silicon regions 16 and layer 12. Typically the area of such bottom, which is essentially also the surface area of the diaphragm, is made to be a square about fifty mils on a side, with remaining portions 10A of substrate 10 acting as a border support which is also fifty miles wide.

The rest of the processing can proceed in conventional fashion. Typically four essentially identical resistors, each typically of between one and two thousand ohms, are formed in the monocrystalline portions of the grown silicon layer, advantageously by forming a localized boron-rich surface layer by diffusion in such regions. Lead connections are provided to opposite ends of such resistors for interconnection into a suitable measuring circuit, such as a Wheatstone bridge.

Figure 4:
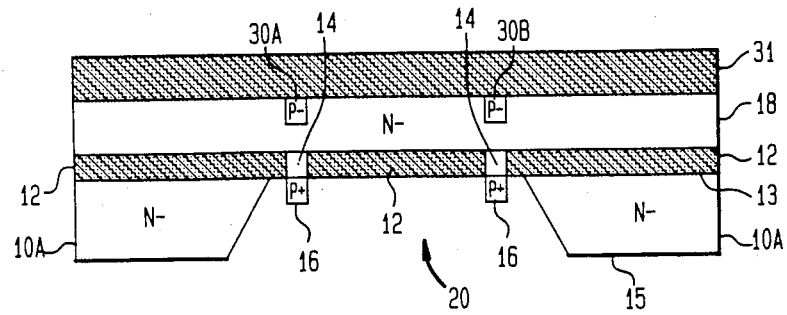

There is shown in FIG. 4 a typical end product absent the leads. Boron-rich p-type zones are formed to serve as the resistors 30A, 30B, 30C and 30D (only 30A and 30B are shown) in the grown layer portion 18 of the chip, to each of whose opposite ends are connected leads (not shown), which have been formed, advantageously, by appropriately patterning a blanket aluminum layer. This layer is typically deposited over a silicon oxide layer 31 which has been apertured to provide contact windows at opposite ends of all of the resistors. The apertures in layer 31 and the conductors are not shown in this view since it is essentially a view that cuts through the middle of each of resistors 30A and 30B, which are contacted at their ends.

For use, the pressure sensitive chip described would be packaged in a suitable pressure sensor assembly of which a typical form is described in U.S. Pat. No. 4,295,117 which issued on Oct. 13, 1981.

It can be appreciated that the specific embodiments are merely illustrative of the general principles of the invention an various modifications are possible consistent with these principles. In particular, substitutions can be made for the various materials mentioned including the etchants, dopants and etch-stop materials. Other suitable piezoresistive semiconductors could be substituted for the silicon. Moreover, the dimensions mentioned and the particular technique used to achieve the particular function desired should generally be viewed as illustrative unless clearly required to achieve the desired ends. Additionally, advantageously, the portions of layer 12 of FIG. 3 which are above the support regions 10A could be removed prior to the epitaxial layer 18 being grown. The epitaxial layer is then grown and these portions of what was layer 12 become monocrystalline silicon and the portions of layer 18 thereabove also become monocrystalline silicon. This allows for transistors, resistors and/or other elements (all not shown) to be fabricated in a top surface of layer 18. Thus signal processing circuitry and other circuitry can be built in the same chip as the pressure sensor and thus there is reduced the need for other separate circuitry.

The embodiments of the invention in which an exclusive property or privilege is claimed are defined as follows:

1. A process for making a chip for use in a pressure transducer comprising the steps of preparing a semiconductive chip of a piezoresistive material for use as a substrate having a front and a back surface, forming a layer of an etch-resistant material over the front surface of said substrate having a plurality of openings exposing regions of the substrate, doping the exposed regions for making them etch-resistant, depositing a layer of the piezoresistive material over the front surface of the substrate for growing a layer to be essentially monocrystalline in portions which overlie the exposed etch resistant regions of the substrate and essentially polycrystalline at portions which overlie the layer of etch-resistant material, thinning a central portion of the substrate underlying the layer of etch-resistant material and the etch-resistant regions by etching until limited by the etch-resistant layer and the etch-resistant regions, and forming resistors in the essentially monocrystalline portions of the grown layer of the piezoresistance material.

2. The process of claim 1 in which the piezoresistance material is silicon and the etch resistant material is a silicon compound taken from the group consisting of silicon dioxide, silicon nitride or a composite of the two.

3. The process of claim 2 in which the etch-resistant regions are boron-diffused to be heavily doped relative to the substrate.

4. The process of claim 1 in which four openings are formed in the layer of etch-resistant material for forming four essentially monocrystalline spaced portions in the grown layer.

5. The process of claim 4 in which a separate resistor is formed at a front surface of each monocrystalline portion.

6. The process of claim 1 in which the thinning step is used to form in the central portion of the substrate a cavity which is substantially square in cross section.

7. The process of claim 6 in which the bottom of the cavity is about fifty mils square and the chip there has a thickness of about one mil.

8. A chip suitable for use in a pressure transducer comprising a silicon chip which has a central region which is considerably thinner than a surrounding border region to be flexible, the thinner region of the chip including essentially monocrystalline portions embedded in a polycrystalline matrix which is of high resistivity material, each said portion including a separate diffused resistor and means at the bottom of the central region including an apertured layer of an etch-resistant material with the apertures filled with heavily doped silicon to be etch-resistant.

* * * * *